(12) United States Patent
McGean et al.

(10) Patent No.: US 8,794,860 B1
(45) Date of Patent: Aug. 5, 2014

(54) ROTATIONAL CONNECTOR DEVICE

(76) Inventors: James W. McGean, Huntington Beach, CA (US); Craig Smith, Huntington Beach, CA (US); Tyrel Beede, Huntington Beach, CA (US)

( * ) Notice: Subject to any disclaimer, the term of this patent is extended or adjusted under 35 U.S.C. 154(b) by 687 days.

(21) Appl. No.: 12/455,839

(22) Filed: Jun. 8, 2009

(51) Int. Cl.
*F16C 11/06* (2006.01)

(52) U.S. Cl.
USPC .......................................................... 403/137

(58) Field of Classification Search
USPC ......... 403/127, 128, 131, 135, 145, 143, 137, 403/319, 320; 411/119, 120, 217–221
See application file for complete search history.

(56) References Cited

U.S. PATENT DOCUMENTS

| | | | | |
|---|---|---|---|---|
| 1,910,926 | A | * | 5/1933 | Lutz .............................. 403/127 |
| 3,011,219 | A | | 12/1961 | Williams |
| 3,429,598 | A | * | 2/1969 | Scheublein, Jr. et al. ..... 403/128 |
| 3,854,557 | A | | 12/1974 | Wilcox |
| 3,945,739 | A | | 3/1976 | Aba |
| 4,070,121 | A | | 1/1978 | Graham |
| 4,154,544 | A | * | 5/1979 | Gair ................................ 403/59 |
| 5,489,161 | A | | 2/1996 | Sugita |
| 5,613,792 | A | | 3/1997 | Terada |
| 5,655,848 | A | | 8/1997 | Catron |
| 5,799,968 | A | | 9/1998 | Loeffler |
| 5,885,022 | A | * | 3/1999 | Maughan et al. ............. 403/135 |
| 6,095,735 | A | * | 8/2000 | Weinstein et al. ............ 411/221 |
| 6,190,080 | B1 | | 2/2001 | Lee |
| 6,231,264 | B1 | * | 5/2001 | McLaughlin et al. .......... 403/76 |
| 6,343,889 | B1 | | 2/2002 | Hendricks |
| 7,144,182 | B1 | | 12/2006 | Jordan |
| 7,261,487 | B2 | | 8/2007 | Urbach |

FOREIGN PATENT DOCUMENTS

GB 2268971 A * 1/1994

* cited by examiner

*Primary Examiner* — Michael P Ferguson
*Assistant Examiner* — Daniel Wiley
(74) *Attorney, Agent, or Firm* — Dennis W. Beech

(57) ABSTRACT

A device for rotational connection between structural members. A generally cylindrical housing may have a central cavity therein with an open bearing end and an open plug end. A shaft at a first end may be inserted into a bearing and retained therein. The bearing may be disposed in the open bearing end and retained by a first fastener ring. A second end of the shaft may protrude outwardly from the housing through the open bearing end. A plug may be threadably engaged with the open plug end that is threaded. The plug may be positioned at an interior end to be adjacent the first end of the shaft that may have a convex surface.

3 Claims, 4 Drawing Sheets

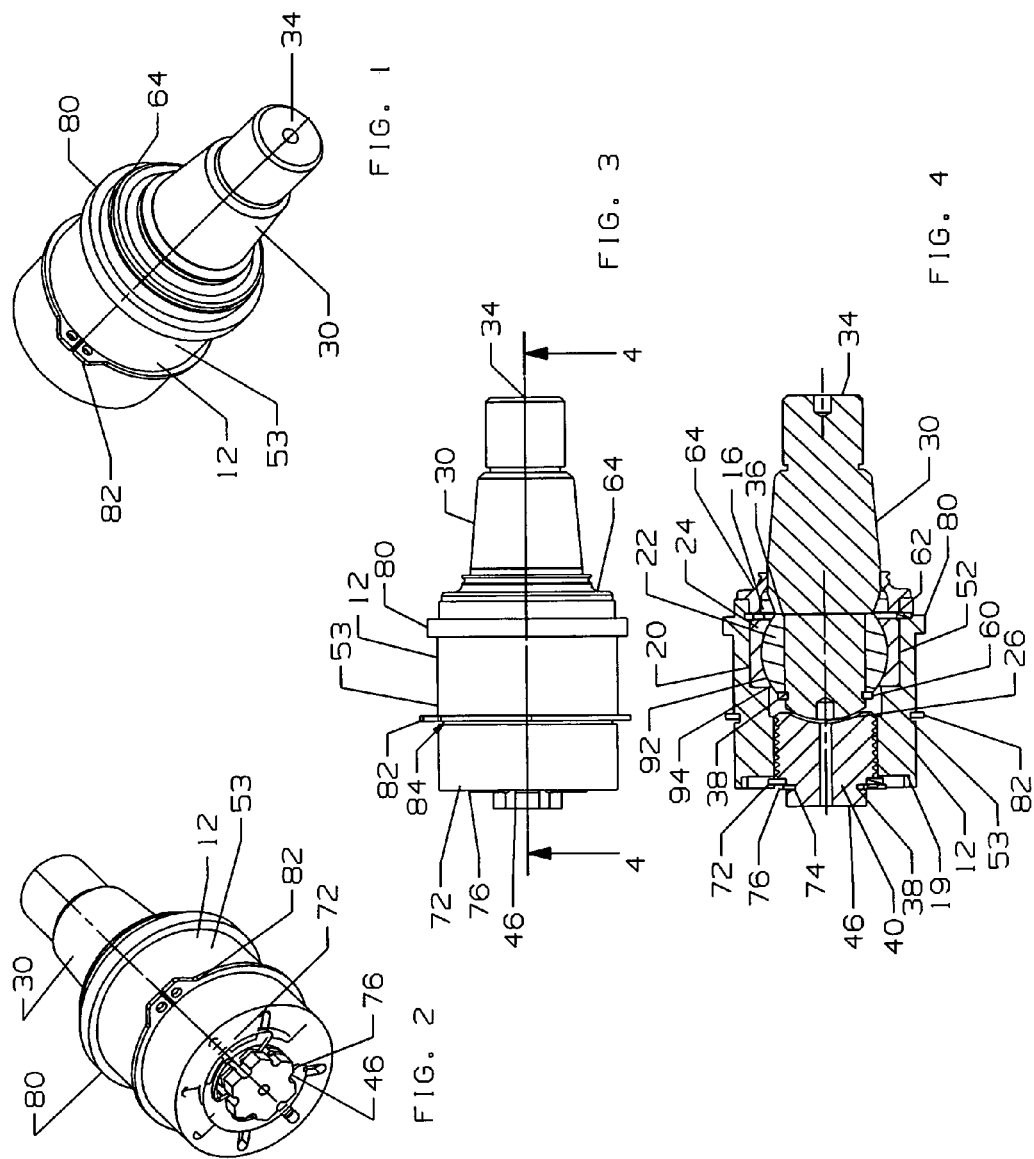

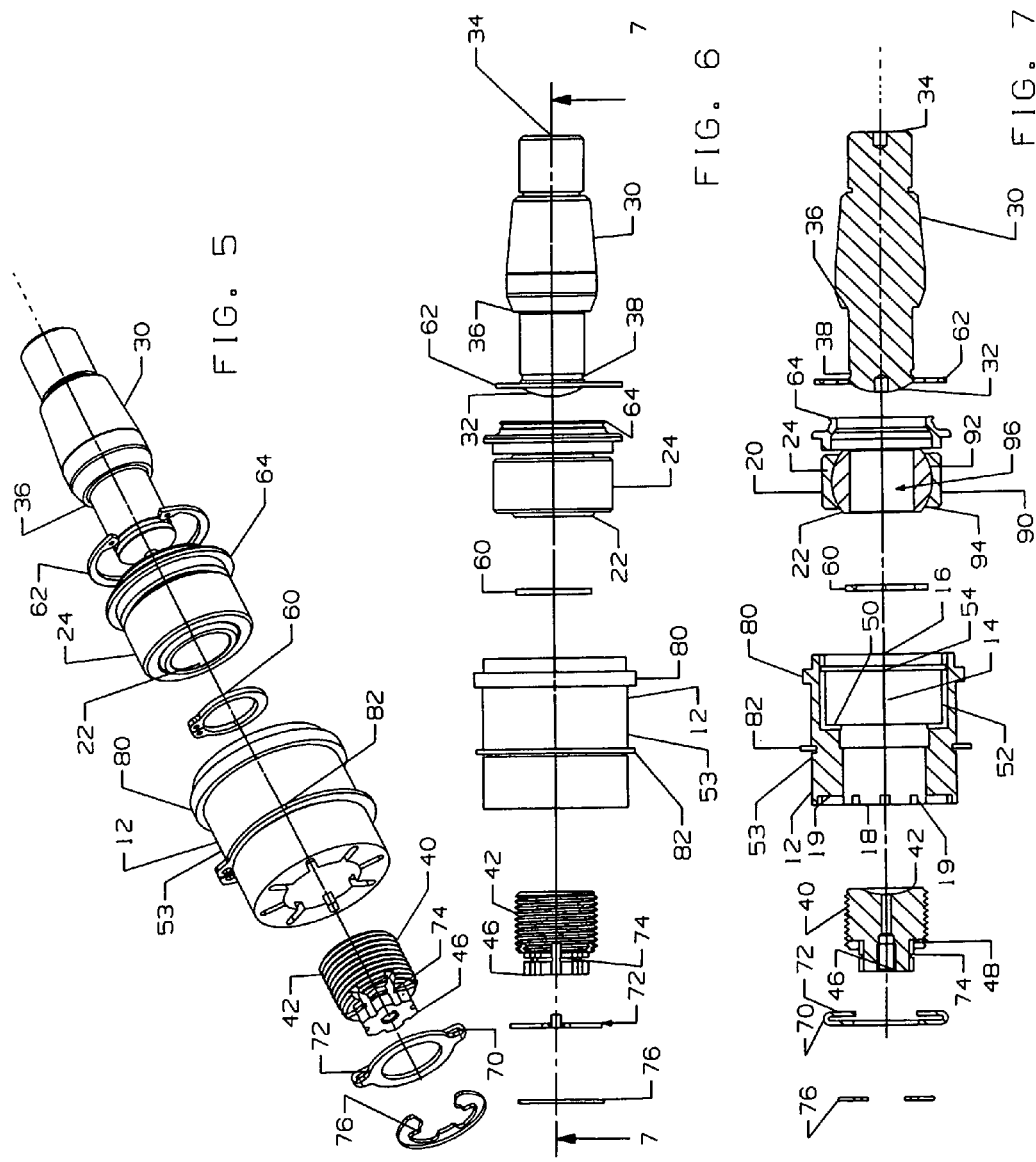

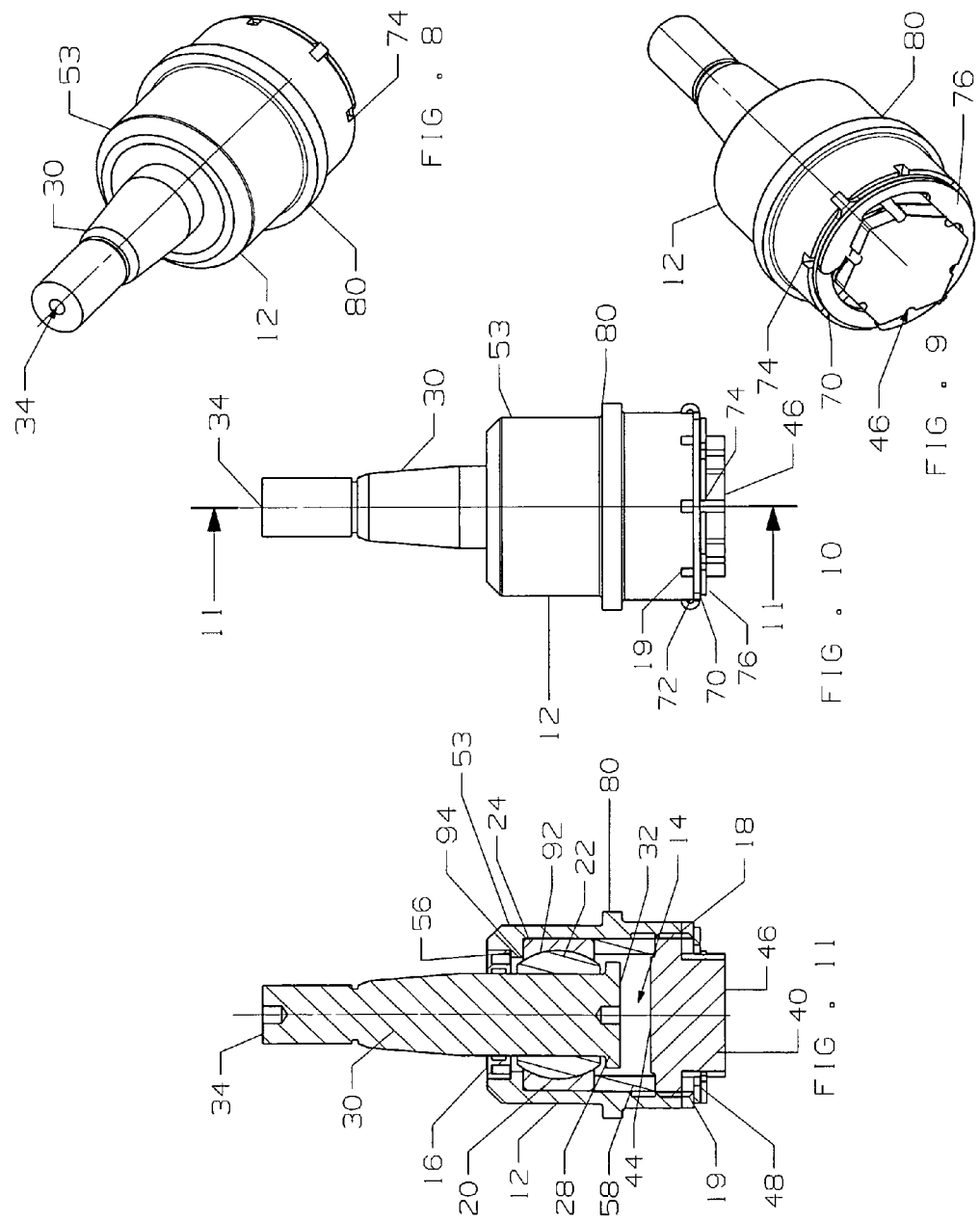

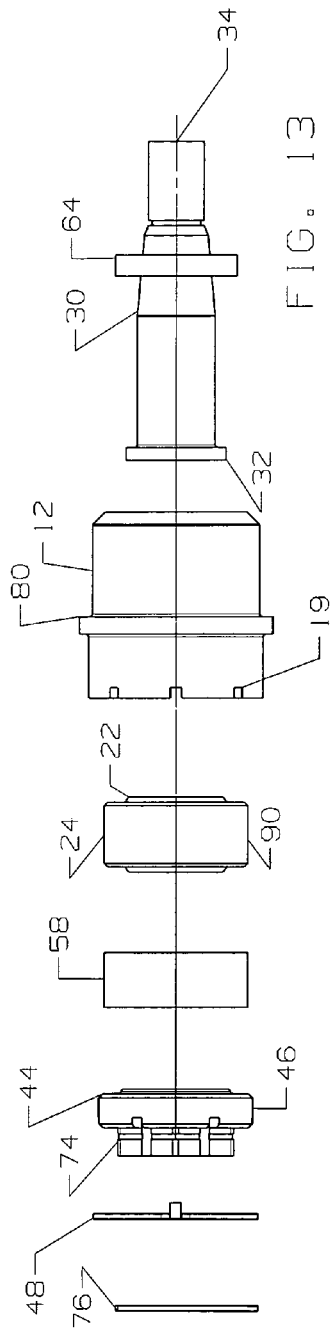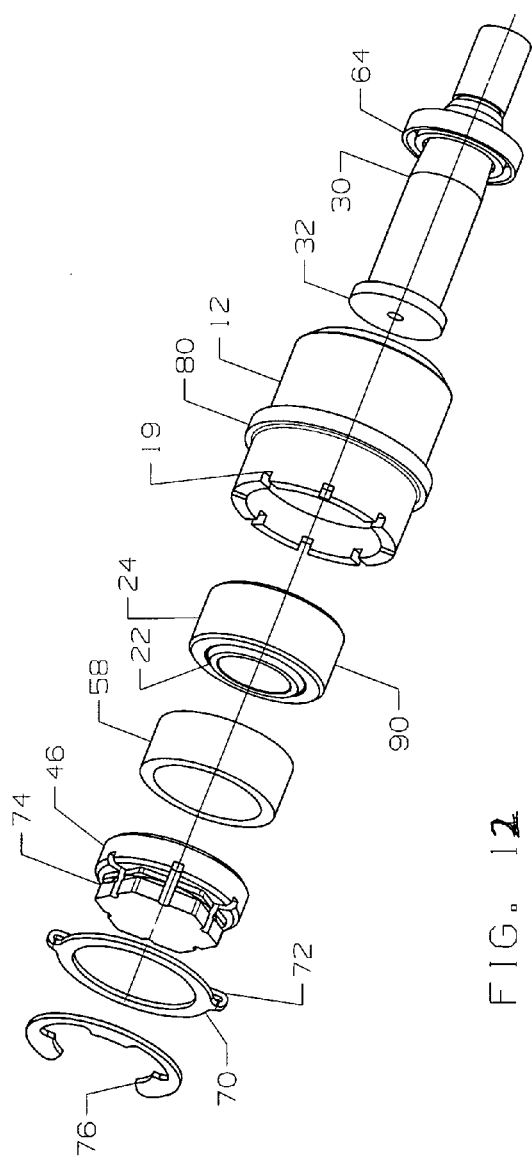

ROTATIONAL CONNECTOR DEVICE

BACKGROUND OF THE INVENTION

This invention relates to devices used for rotational connection between structured members generally found in land vehicles principally for support of wheels used to change direction of vehicle motion, for example, for connection between control arms, steering knuckles, spindle brackets, tie rods and the like, that are generally ball joint devices. The new rotational connecting device has a housing with a cavity and two open ends; an annular bearing ring retained in the cavity with one end of a shaft inserted through and retained in the bearing ring and the second end of the shaft extending outwardly through one open end of the housing; and a plug inserted in an retained in the second open end of the housing.

Various ball joint types of devices may be known, particularly for land vehicles, but also for other rotational connection applications. The most common ball joint may be structured with a housing having a cylindrical cavity that has an open shank end and a closed retaining end. A stud member that has a shank with a spherical shape or ball attached at one end may then be inserted in the open shank end to seat the ball in the retaining end of the housing. The stud member may be retained in the housing by a retaining ring positioned over the ball and a lip formed or swaged at the open shank end of the housing. The portion of such devices that often deteriorates with use is the ball surface at the location of friction with the socket located in the retaining end of the housing.

Known ball joint type devices with a retaining lip and closed retaining end as parts of housing may be difficult to repair because of the generally permanent capture of the stud member in the housing. Various insert devices formed of material such as plastic or composites may have been positioned at the retaining end of a housing to aid in reducing deterioration of ball joints; however, such devices do not facilitate repair or parts replacements. There may also be known ball joint devices that have an open retainer end or a housing that may be split apart. Some open retainer end devices may have a single member annular bearing positioned on the stud for the bearing member to engage the seat formed at the shank opening of the housing and the socket for the ball may be inserted through the retaining end and retained by multiple retaining plates with indicator devices that are retained by a flange. Again such devices may be difficult and expensive to disassembled and repair.

SUMMARY OF THE INVENTION

The present invention is directed to devices for rotational connection between structural members. A generally cylindrical housing may have a central cavity therein with an open bearing end and an open plug end. A shaft at a first end may be inserted into a bearing and retained therein. The bearing may be disposed in the open bearing end and retained by a first fastener ring. A second end of the shaft may protrude outwardly from the housing through the open bearing end. A plug may be threadably engaged with the open plug end that is threaded. The plug may be positioned at an interior end to be adjacent the first end of the shaft that may have a convex surface.

These and other features, aspects and advantages of the present invention will become better understood with reference to the following drawings, description and claims.

BRIEF DESCRIPTION OF THE DRAWINGS

FIG. 1 illustrates a perspective attachment shaft second end view of the rotational connector device according to an embodiment of the invention;

FIG. 2 illustrates a perspective plug end view of the device according to an embodiment of the invention;

FIG. 3 illustrates a side view of the device according to an embodiment of the invention;

FIG. 4 illustrates a cross-sectional view of the device according to an embodiment of the invention;

FIG. 5 illustrates a perspective exploded view of the device according to an embodiment of the invention;

FIG. 6 illustrates a side exploded view of the device according to an embodiment of the invention;

FIG. 7 illustrates a cross-sectional exploded view of the device according to an embodiment of the invention;

FIG. 8 illustrates a perspective shaft end view of the device according to an embodiment of the invention;

FIG. 9 illustrates a perspective plug end view of the device according to an embodiment of the invention;

FIG. 10 illustrates a side view of the device according to an embodiment of the invention;

FIG. 11 illustrates a cross-sectional view of the device according to an embodiment of the invention;

FIG. 12 illustrates a perspective exploded view of the device according to an embodiment of the invention;

FIG. 13 illustrates a side exploded view of the device according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIGS. 1 through 14, a rotational connector device 10 may have a generally cylindrical housing 12 with a central cavity 14 and an opening at each end 16, 18. The bearing end 16 may be sized for insertion of an annular bearing ring 20 that may have an inner member 22 and outer member 24. The outer member 24 may have a generally flat exterior perimeter surface 90 and a concave interior surface 92 for receipt of a convex exterior perimeter surface 94 of the inner member 22. The mating of the surfaces 92, 94 may allow the inner member 22 to rotate within the outer member 24 such that when a shaft 30 may be positioned in the inner member 22 in aperture 96 that may have a generally flat annular interior surface the shaft may be rotated in the bearing ring 20. A shaft 30 may be inserted through the inner member 22 to position a first end 32 interior to the housing 12 and a second end 34 exterior to the housing 12. The plug end 18 of the housing 12 may be threaded for threadable attachment of a plug 40 to close the plug end 18.

Referring to FIGS. 1 through 7, for a device 10 that may have a shaft 30 with a convex first end 32, the plug 40 may have a concave interior end 42 that is shaped for compatible abutment of the first end 32. A rotational connector device 10 may be assembled by inserting the first end 32 through the inner member 22 of the bearing ring 20 to be retained by an annular step 36 and a fastener ring 60 engage in a groove 38. The bearing ring 20 may then be inserted in the cavity 14 to be retained against an annular step 50 spaced apart from the bearing end 16 of the housing 12 and against a fastener ring 62 sized to engage a groove 54 formed in the housing wall 52 adjacent the open bearing end 16.

The plug 40 may be rotatably threaded into the housing 12 open plug end 16 until the concave interior end 42 is adjacent to the convex first end 32 of the shaft 30 at a desired position for the device 10 operation. The concave interior end 42 may be spaced apart from the first end 32 a short distance such as 0.0002 to 0.010 inches to allow the first end 32 of the shaft 30 to freely rotate during normal operating conditions with the shaft 30 positioned in the housing 12 supported by the bearing ring 20. This may reduce wear on the surfaces 32, 42.

In an extreme shock force condition the plug 40 may restrain movement of the shaft 30 in the housing 12 and bearing ring 20 to minimize damage. For some applications, the plug 40 may be positioned for the interior end 42 to abut the first end 32 of the shaft 30. The plug 40 may be retained at the position selected by a rotational locking device, for example, a pin, a key or like device. The locking device may also be structured with a lock ring 70 having protrusions 72. The lock ring 70 may be positioned over the outer end 46 of the plug 40 that may have slots 48 radially space around the perimeter positioned for compatibility with slots 19 formed in the housing wall 52 at the plug end 18. The protrusions 72 may engage adjacent slots 19, 48 to fix the position of the plug 40 and the lock ring 70 may be retained in position by a fastener ring 76 in a groove 74.

The structure of the device 10 may allow adjustment of the shaft 30 and plug 40 pressure interface without disassembly of the device 10. Such an adjustment over time may allow longer life for the device. The elimination of a flange at the bearing end of the housing 12 may allow for ease of repair of a device 10 by removal of fastener rings 60, 62 for replacement of the bearing ring 20 or shaft 30.

Referring to FIGS. 8 through 14, an alternate rotational connector device 10 may incorporate structure for longitudinal motion of the shaft 30 in the bearing ring 20. The shaft 30 may have a flange 28 or head at the first end 32 and the shaft 30 may be slidably inserted into the inner member 22 of the bearing ring 20. The housing 12 may have a rim 56 adjacent the bearing end 16 against which the bearing ring 20 may be positioned in the cavity 14. A bearing sleeve 58 may then be inserted in the cavity 14 to abut the bearing ring 20 and the plug 40 may be rotatably threaded into the plug end 18 of the housing to retain the bearing ring 20 in place. The plug 40 may be retained in position as previously described by use of a rotational locking device. In this embodiment the interior end 44 of the plug 40 may be generally flat since the first end 32 of the shaft 30 is positioned to allow longitudinal motion within the housing 12.

The housing 12 may have a flange 80 and groove 84 formed as part of the external surface 53 of the housing wall 52 for use in retaining the device 10 in a structural arm or element of a vehicle. A snap ring 82 may be positioned in the groove 84. The shaft 30 second end 34 may be formed for a press fit or fastener attachment to a vehicle structural element. The second end 34 may also be threaded for attachment.

While the invention has been particularly shown and described with respect to the illustrated embodiments thereof, it will be understood by those skilled in the art that the foregoing and other changes in form and details may be made therein without departing from the spirit and scope of the invention.

We claim:

1. A device for rotational connection between structural members comprising:
   a generally cylindrical housing having a central cavity therein with an open bearing end and an open plug end opposite the open bearing end, the open plug end comprising a plurality of radially extending slots circumferentially spaced about an end portion of the open plug end;
   a bearing fixed within the central cavity adjacent the open bearing end, the bearing comprising an outer member disposed radially within the housing, and an inner member disposed radially within and rotatably engaged with the outer member, wherein the bearing is retained within the central cavity by a first fastener ring;
   a shaft having opposing first and second ends, wherein the first end is inserted into the inner member of the bearing and retained therein by a second fastener ring disposed within a groove on the shaft adjacent the first end, wherein an end portion of the first end comprises a convex portion;
   a second end of said shaft protruding protrudes outwardly from said housing through said open bearing end; and
   a plug threadably engaged within said open plug end, said plug comprising opposing inner and outer ends, the inner end comprising a threaded periphery and a concave end surface configured for engagement with the convex surface of the first end of the shaft, and the outer end comprising a plurality of notches formed circumferentially around a periphery of the outer end, and a circumferential groove adjacent the notches,
   a lock ring configured to be received over the outer end of the plug, the lock ring comprising at least one axially extending protrusion formed on a periphery thereof, the protrusion configured to be simultaneously received in one of the notches of the plug and one of the slots of the housing, to rotationally lock the plug with respect to the housing; and
   a third fastener ring disposed within the groove on the outer end of the plug, to axially lock the lock ring and the plug with respect to the housing.

2. The device as in claim 1 wherein said second fastener ring is removably disposed in a groove adjacent said first end.

3. The device as in claim 1 wherein said bearing is positioned on an annular step formed on a housing wall in said cavity and said removable first fastening ring is disposed in a groove formed in said housing wall.

* * * * *